US012694634B2

(12) United States Patent
Sun et al.

(10) Patent No.: US 12,694,634 B2
(45) Date of Patent: Jul. 28, 2026

(54) INJECTIVE 3D DEFORMATIONS BASED ON 2D MESH DEFORMATIONS

(71) Applicant: Adobe Inc., San Jose, CA (US)

(72) Inventors: Bo Sun, New York, NY (US); Thibault Groueix, San Francisco, CA (US); Noam Aigerman, Montreal (CA)

(73) Assignee: Adobe Inc., San Jose, CA (US)

( * ) Notice: Subject to any disclaimer, the term of this patent is extended or adjusted under 35 U.S.C. 154(b) by 295 days.

(21) Appl. No.: 18/630,007

(22) Filed: Apr. 9, 2024

(65) Prior Publication Data

US 2025/0316039 A1     Oct. 9, 2025

(51) Int. Cl.
*G06T 19/20* (2011.01)
*G06T 17/20* (2006.01)

(52) U.S. Cl.
CPC .............. *G06T 19/20* (2013.01); *G06T 17/20* (2013.01); *G06T 2219/2016* (2013.01); *G06T 2219/2021* (2013.01)

(58) Field of Classification Search
CPC . G06T 17/20; G06T 19/20; G06T 2219/2016; G06T 2219/2021
See application file for complete search history.

(56) References Cited

U.S. PATENT DOCUMENTS

| | | | |
|---|---|---|---|
| 2014/0267306 A1* | 9/2014 | Koniaris | G06T 13/20 |
| | | | 345/473 |
| 2025/0166311 A1* | 5/2025 | Montero, Jr. | G06T 19/003 |
| 2025/0232518 A1* | 7/2025 | Chatterjee | G06T 17/00 |

OTHER PUBLICATIONS

Aigerman et al., Generative Escher Meshes, Available Online at: https://arxiv.org/pdf/2309.14564.pdf, Nov. 30, 2023, 19 pages.
Aigerman et al., Hyperbolic Orbifold Tutte Embeddings, ACM Transactions on Graphics, vol. 35, No. 6, Nov. 2016, 14 pages.
Aigerman et al., Injective and Bounded Distortion Mappings in 3D, Association for Computing Machinery Transactions on Graphics, vol. 32, No. 4, Jul. 21, 2013, pp. 1-14.
Aigerman et al., Neural Jacobian Fields: Learning Intrinsic Mappings of Arbitrary Meshes, Association for Computing Machinery Trans. Graph., vol. 41, No. 4, Jul. 2022, pp. 1-17.

(Continued)

*Primary Examiner* — Daniel F Hajnik
*Assistant Examiner* — Jed-Justin Imperial
(74) *Attorney, Agent, or Firm* — Kilpatrick Townsend & Stockton LLP

(57) ABSTRACT

Aspects and features of the present disclosure relate to providing injective three-dimensional (3D) deformations based on two-dimensional (2D) mesh deformations. For example, a method involves defining at least one 2D mesh deformation based on a designated position of an object represented by an input neural radiance field (NeRF). The method also involves applying the 2D mesh deformation(s) to a 3D piecewise-linear map that operates over a plane and preserves a normal direction to produce prismatic maps. The method further involves composing a 3D deformation for the object from layers defined by the prismatic maps, and parameterizing the 3D piecewise-linear map. The method additionally involves storing or rendering, using the 3D piecewise-linear map, a deformed NeRF injectively representing the object in the designated position. Aspects also include computer systems, apparatus, and computer programs configured to perform the method.

20 Claims, 7 Drawing Sheets

(56) References Cited

OTHER PUBLICATIONS

Bautista et al., GAUDI: a Neural Architect for Immersive 3D Scene Generation, Available Online at: https://arxiv.org/pdf/2207.13751. pdf, Jul. 27, 2022, pp. 1-21.

Bednarik et al., Shape Reconstruction by Learning Differentiable Surface Representations, Proceedings of the IEEE/CVF Conference on Computer Vision and Pattern Recognition, Jun. 2020, pp. 4716-4725.

Behrmann et al., Invertible Residual Networks, Available Online at: https://arxiv.org/pdf/1811.00995.pdf, May 18, 2019, 18 pages.

Campen et al., Bijective Maps from Simplicial Foliations, Association for Computing Machinery Transactions on Graphics, vol. 35, No. 4, Jul. 11, 2016, pp. 1-15.

Cao et al., HexPlane: a Fast Representation for Dynamic Scenes, Available Online at: https://arxiv.org/pdf/2301.09632.pdf, Mar. 27, 2023, 21 pages.

Chen et al., Animatable Neural Radiance Fields from Monocular RGB Videos, Available Online at: https://arxiv.org/pdf/2106.13629. pdf, Sep. 7, 2021, pp. 1-12.

Chen et al., Learning Implicit Fields for Generative Shape Modeling, In Proceedings of the IEEE/CVF Conference on Computer Vision and Pattern Recognition, Available online at: https://arxiv.org/pdf/1812.02822.pdf, Sep. 16, 2019, 10 pages.

Chen et al., Neural Ordinary Differential Equations, Available Online at: https://arxiv.org/pdf/1806.07366.pdf, Dec. 14, 2019, pp. 1-18.

Chen et al., Neuraleditor: Editing Neural Radiance Fields via Manipulating Point Clouds, Available Online at: https://arxiv.org/pdf/2305.03049.pdf, May 4, 2023, pp. 1-19.

Chen et al., TensoRF: Tensorial Radiance Fields, European Conference on Computer Vision (ECCV), Nov. 29, 2022, pp. 1-33.

Deng et al., 3D-aware Conditional Image Synthesis, Available Online at: https://arxiv.org/pdf/2302.08509.pdf, May 1, 2023, 15 pages.

Deng et al., A Survey of Non-rigid 3d Registration, STAR—State of The Art Report, vol. 41, No. 2, Mar. 16, 2022, 31 pages.

Deng et al., Deformed Implicit Field: Modeling 3D Shapes with Learned Dense Correspondence, Available Online at: https://arxiv.org/pdf/2011.13650.pdf, Mar. 29, 2021, 16 pages.

Dinh et al., Density Estimation Using Real NVP, Machine Learning, Available online at: https://arxiv.org/pdf/1605.08803.pdf, Feb. 27, 2017, pp. 1-32.

Dinh et al., NICE: Non-Linear Independent Components Estimation, Machine Learning, Available online at: https://arxiv.org/pdf/1410.8516.pdf, Apr. 10, 2015, 13 pages.

Du et al., Optimizing Global Injectivity for Constrained Parameterization, Association for Computing Machinery Transactions on Graphics, vol. 40, No. 6, Dec. 2021, pp. 1-17.

Fan et al., A Point Set Generation Network for 3D Object Reconstruction from a Single Image, Available Online at: https://arxiv.org/pdf/1612.00603.pdf, Dec. 7, 2016, 12 pages.

Floater, One-to-one Piecewise Linear Mappings Over Triangulations, Mathematics of Computation, vol. 72, No. 242, Oct. 17, 2002, pp. 685-696.

Fridovich-Keil et al., K-Planes: Explicit Radiance Fields in Space, Time, and Appearance, Available Online at: https://arxiv.org/pdf/2301.10241.pdf, Mar. 24, 2023, pp. 1-15.

Fu et al., Computing Inversion-free Mappings by Simplex Assembly, Association for Computing Machinery Transactions on Graphics, vol. 36, No. 6, Dec. 5, 2016, pp. 1-12.

Gao et al., Dynamic View Synthesis from Dynamic Monocular Video, Available Online at: https://arxiv.org/pdf/2105.06468.pdf, May 13, 2021, 11 pages.

Gao et al., GET3D: A Generative Model of High Quality 3D Textured Shapes Learned from Images, Available Online at: https://arxiv.org/pdf/2209.11163.pdf, Sep. 22, 2022, 39 pages.

Garanzha et al., Foldover-free Maps in 50 Lines of Code, Available Online at: https://arxiv.org/pdf/2102.03069.pdf, Feb. 5, 2021, pp. 1-13.

Germain et al., MADE: Masked Autoencoder for Distribution Estimation, Available Online at: https://arxiv.org/pdf/1502.03509. pdf, Jun. 5, 2015, 10 pages.

Grathwohl et al., FFJORD: Free-Form Continuous Dynamics for Scalable Reversible Generative Models, Available Online at: https://arxiv.org/abs/1810.01367, Oct. 22, 2018, pp. 1-13.

Groueix et al., 3D-CODED: 3D Correspondences by Deep Deformation, Proceedings of the European Conference on Computer Vision (ECCV), Jul. 27, 2018, pp. 1-23.

Groueix et al., AtlasNet: A Papier-Mache Approach to Learning 3D Surface Generation, Computer Vision and Pattern Recognition (cs.CV), Jul. 20, 2018, 16 pages.

Gupta et al., 3DGen: Triplane Latent Diffusion for Textured Mesh Generation, Available Online at: https://arxiv.org/pdf/2303.05371. pdf, Mar. 27, 2023, 10 pages.

Gupta et al., Neural Mesh Flow: 3D Manifold Mesh Generation via Diffeomorphic Flows, Available Online at: https://arxiv.org/pdf/2007.10973.pdf, Dec. 2, 2020, pp. 1-12.

Holden et al., Learning an Inverse rig Mapping for Character Animation, Available Online at: https://theorangeduck.com/media/uploads/rigmapping.pdf, Aug. 2015, 9 pages.

Hu et al., SHERF: Generalizable Human NeRF from a Single Image, Available Online at: https://arxiv.org/abs/2303.12791, Aug. 16, 2023, 18 pages.

Hu et al., Tri-MipRF: Tri-Mip Representation for Efficient Anti-Aliasing Neural Radiance Fields, Available Online at: https://arxiv.org/pdf/2307.11335.pdf, Jul. 21, 2023, 17 pages.

Huang et al., ARAPReg: An As-Rigid-As Possible Regularization Loss for Learning Deformable Shape Generators, Computer Vision and Pattern Recognition, Sep. 21, 2021, 17 pages.

Huang et al., MeshODE: A Robust and Scalable Framework for Mesh Deformation, Available Online at: https://arxiv.org/pdf/2005. 11617.pdf, May 23, 2020, pp. 1-20.

Huang et al., Tri-Perspective View for Vision-Based 3D Semantic Occupancy Prediction, Proceedings of the Institute of Electrical and Electronics Engineers/CVF Conference on Computer Vision and Pattern Recognition, Mar. 2, 2023, pp. 9223-9232.

Jacobson et al., Skinning: Real-Time Shape Deformation, Association for Computing Machinery, Special Interest Group on Computer Graphics and Interactive Techniques Course, ACM Siggraph, Jul. 2014, pp. 1-2.

Jakab et al., KeypointDeformer: Unsupervised 3D Keypoint Discovery for Shape Control, Proceedings of the Institute of Electrical and Electronics Engineers/CVF Conference on Computer Vision and Pattern Recognition, Apr. 22, 2021, pp. 12783-12792.

Jambon et al., Nerfshop: Interactive Editing of Neural Radiance Fields, Proceedings of the ACM on Computer Graphics and Interactive Techniques, vol. 6, No. 1, May 2023, pp. 1-21.

Jang et al., D-TensoRF: Tensorial Radiance Fields for Dynamic Scenes, Available Online at: https://arxiv.org/abs/2212.02375, Dec. 6, 2022, pp. 1-21.

Jiang et al., NeuMan: Neural Human Radiance Field from a Single Video, arxiv.org, Sep. 22, 2022, pp. 1-21.

Jiang et al., SelfRecon: Self Reconstruction Your Digital Avatar from Monocular Video, Institute of Electrical and Electronics Engineers/CVF Conference on Computer Vision and Pattern Recognition (CVPR), pp. 1-11, 11 pages, 2022.

Jiang et al., ShapeFlow: Learnable Deformations Among 3D Shapes, Advances in Neural Information Processing Systems, vol. 33, 34th Conference on Neural Information Processing Systems (NeurIPS 2020), Jun. 23, 2021, pp. 1-16.

Jiang et al., Simplicial Complex Augmentation Framework for Bijective Maps, Association for Computing Machinery Transactions on Graphics, vol. 36, No. 6, Article 186, Nov. 2017, pp. 1-9.

Jin et al., TensoIR: Tensorial Inverse Rendering, Proceedings of the Institute of Electrical and Electronics Engineers/CVF Conference on Computer Vision and Pattern Recognition (CVPR), Mar. 17, 2024, 19 pages.

Kanazawa et al., Learning Category-Specific Mesh Reconstruction from Image Collections, Proceedings of the European Conference on Computer Vision (ECCV), Mar. 2018, 16 pages.

Kingma et al., Adam: A Method for Stochastic Optimization, International Conference on Learning Representations, Conference

(56) References Cited

OTHER PUBLICATIONS paper at ICLR 2015, Available Online at: https://arxiv.org/pdf/1412.6980.pdf, Jan. 30, 2017, pp. 1-15.

Kingma et al., Improved Variational Inference with Inverse Autoregressive Flow, 29th Conference on Neural Information Processing Systems (NIPS 2016), Jan. 30, 2017, 16 pages.

Kovalsky et al., Controlling Singular Values with Semidefinite Programming, Association for Computing Machinery Transactions on Graphics, vol. 33, No. 4, Jul. 27, 2014, 13 pages.

Kwon et al., Neural Human Performer: Learning Generalizable Radiance Fields for Human Performance Rendering, Proceedings of the 34th International Conference on Neural Information Processing Systems, Advances in Neural Information Processing Systems, Sep. 15, 2021, 15 pages.

Lei et al., CaDeX: Learning Canonical Deformation Coordinate Space for Dynamic Surface Representation via Neural Homeomorphism, Proceedings of the Institute of Electrical and Electronics Engineers/CVF Conference on Computer Vision and Pattern Recognition, Mar. 30, 2022, pp. 1-11.

Li et al., Incremental Potential Contact: Intersection-and Inversion-free, Large-deformation Dynamics, Association for Computing Machinery Transactions on Graphics, vol. 39, No. 4, Article No. 49, Jul. 2020, pp. 1-20.

Li et al., Interactive Geometry Editing of Neural Radiance Fields, arXiv, Available Online at: https://arxiv.org/pdf/2303.11537.pdf, Apr. 3, 2023, 9 pages.

Li et al., Learning Skeletal Articulations with Neural Blend Shapes, Association for Computing Machinery Transactions on Graphics, vol. 40, No. 4, Article 130, Aug. 2021, pp. 1-15.

Liang et al., SPIDR: SDF-based Neural Point Fields for Illumination and Deformation, arXiv, Available Online at: https://arxiv.org/pdf/2210.08398.pdf, Apr. 7, 2023, pp. 1-21.

Liu et al., DeepMeta Handles: Learning Deformation Meta-Handles of 3D Meshes with Biharmonic Coordinates, Proceedings of the Institute of Electrical and Electronics Engineers/CVF Conference on Computer Vision and Pattern Recognition, Mar. 2021, pp. 12-21.

Liu et al., Editing Conditional Radiance Fields, Proceedings of the International Conference on Computer Vision (ICCV), Jun. 4, 2021, pp. 1-24.

Liu et al., NeuroSkinning: Automatic Skin Binding for Production Characters with Deep Graph Networks, Association for Computing Machinery Transactions on Graphics, vol. 38, No. 4, Article No. 114, Jul. 2019, pp. 1-12.

Loper et al., SMPL: A Skinned Multi-Person Linear Model, Association for Computing Machinery, Transactions on Graphics, vol. 34, No. 6, Article No. 248, Oct. 26, 2015, 16 pages.

Lv et al., Joint Progressive and Coarse-to-Fine Registration of Brain MRI via Deformation Field Integration and Non-Rigid Feature Fusion, Institute of Electrical and Electronics Engineers Transactions on Medical Imaging, vol. 41, No. 10, Apr. 26, 2022, pp. 1-15.

Mahmood et al., AMASS: Archive of Motion Capture as Surface Shapes, International Conference on Computer Vision and Pattern Recognition, Apr. 5, 2019, 12 pages.

Mescheder et al., Occupancy Networks: Learning 3D Reconstruction in Function Space, Proceedings of the IEEE/CVF Conference on Computer Vision and Pattern Recognition, Apr. 30, 2019, 11 pages.

Mildenhall et al., NeRF: Representing Scenes as Neural Radiance Fields for View Synthesis, Communications of the ACM, vol. 65, No. 1, Jan. 2022, pp. 99-106.

Morreale et al., Neural Surface Maps, Institute of Electrical and Electronics Engineers Conference on Computer Vision and Pattern Recognition, Mar. 2021, pp. 4639-4648.

Muller et al., Air Meshes for Robust Collision Handling, Association for Computing Machinery Transactions on Graphics, vol. 34, No. 4, Article No. 133, Aug. 2015, pp. 1-9.

Muller et al., Instant Neural Graphics Primitives with a Multiresolution Hash Encoding, Association for Computing Machinery Transactions on Graphics, vol. 41, No. 4, Article No. 102, Jul. 2022, pp. 1-15.

Niemeyer et al., Occupancy Flow: 4D Reconstruction by Learning Particle Dynamics, Proceedings of the Institute of Electrical and Electronics Engineers International Conference on Computer Vision (ICCV), Oct. 2019, pp. 5379-5389.

Oord et al., Wavenet: A Generative Model for Raw Audio, arXiv, Available Online at: https://arxiv.org/pdf/1609.03499.pdf, Sep. 19, 2016, pp. 1-15.

Oquab et al., DINOv2: Learning Robust Visual Features without Supervision, Transactions on Machine Learning Research, Feb. 2, 2024, pp. 1-32.

Papamakarios et al., Masked Autoregressive Flow for Density Estimation, Advances in Neural Information Processing Systems 30 (NIPS 2017), Jun. 14, 2018, pp. 1-17.

Park et al., DeepSDF: Learning Continuous Signed Distance Functions for Shape Representation, Proceedings of the IEEE/CVF Conference on Computer Vision and Pattern Recognition, Jan. 16, 2019, pp. 1-19.

Park et al., HyperNeRF: A Higher-Dimensional Representation for Topologically Varying Neural Radiance Fields, ACM Transactions on Graphics, vol. 40, No. 6, Dec. 2021, pp. 1-12.

Park et al., Nerfies: Deformable Neural Radiance Fields, Proceedings of the IEEE/CVF International Conference on Computer Vision (ICCV), Sep. 10, 2021, pp. 5865-5874.

Paschalidou et al., Neural Parts: Learning Expressive 3D Shape Abstractions with Invertible Neural Networks, In Proceedings Institute of Electrical and Electronics Engineers Conference on Computer Vision and Pattern Recognition (CVPR), Mar. 2021, pp. 3204-3215.

Peng et al., CageNeRF: Cage-based Neural Radiance Field for Generalized 3D Deformation and Animation, In Advances in Neural Information Processing Systems, Oct. 31, 2022, p. 1-14.

Peng et al., Convolutional Occupancy Networks, In Computer Vision—ECCV 2020: 16th European Conference, Aug. 2020, pp. 1-17.

Peng et al., Implicit Neural Representations with Structured Latent Codes for Human Body Modeling, Institute of Electrical and Electronics Engineers Transactions on Pattern Analysis and Machine Intelligence, Feb. 16, 2023, pp. 9895-9907, Abstract, pp. 1-4.

Peng et al., Neural Body: Implicit Neural Representations with Structured Latent Codes for Novel View Synthesis of Dynamic Humans, Conference on Computer Vision and Pattern Recognition (CVPR), Mar. 2021, pp. 9054-9063.

Rabinovich et al., Scalable Locally Injective Mappings, ACM Transactions on Graphics (TOG), vol. 36, No. 2, Apr. 2017, pp. 1-16.

Radford et al., Learning Transferable Visual Models from Natural Language Supervision, In International Conference on Machine Learning, Available online at: https://arxiv.org/pdf/2103.00020.pdf, Feb. 26, 2021, pp. 42.

Rezende et al., Variational Inference with Normalizing Flows, International Conference on Machine Learning, vol. 37, Jun. 14, 2016, 10 pages.

Salimans et al., Markov Chain Monte Carlo and Variational Inference: Bridging the Gap, Proceedings of the 32nd International Conference on Machine Learning, vol. 37, Jul. 6, 2015, 9 pages.

Schuller et al., Locally Injective Mappings, Computer Graphics Forum, Eurographics Symposium on Geometry Processing, vol. 32, No. 5, Jul. 2013, 11 pages.

Shao et al., Tensor4D: Efficient Neural 4D Decomposition for High-fidelity Dynamic Reconstruction and Rendering, Institute of Electrical and Electronics Engineers/CVF Conference on Computer Vision and Pattern Recognition (CVPR), Apr. 2023, pp. 16632-16642.

Shue et al., 3D Neural Field Generation Using Triplane Diffusion, Proceedings of the Institute of Electrical and Electronics Engineers/CVF Conference on Computer Vision and Pattern Recognition (CVPR), Jun. 2023, pp. 20875-20886.

Smith et al., Bijective Parameterization with Free Boundaries, Association for Computing Machinery Digital Library, vol. 34, No. 4, Jul. 27, 2015, 9 pages.

Sorkine et al., As-Rigid-As-Possible Surface Modeling, SGP '07: Proceedings of the fifth Eurographics symposium on Geometry processing, vol. 4, Jul. 2007, 8 pages.

(56) References Cited

OTHER PUBLICATIONS

Su et al., A-NeRF: Articulated Neural Radiance Fields for Learning Human Shape, Appearance, and Pose, 35th Conference on Neural Information Processing Systems, Oct. 2021, pp. 1-14.

Sun et al., IDE-3D: Interactive Disentangled Editing for High-Resolution 3D-Aware Portrait Synthesis, Association for Computing Machinery Transactions on Graphics (TOG), vol. 41, No. 6, Dec. 2022, pp. 1-10.

Tancik et al., Learned Initializations for Optimizing Coordinate-based Neural Representations, Proceedings of the IEEE/CVF Conference on Computer Vision and Pattern Recognition (CVPR), Mar. 2021, pp. 2846-2855.

Tancik et al., Nerfstudio: A Modular Framework for Neural Radiance Field Development, Association for Computing Machinery SIGGRAPH 2023 Conference Proceedings, SIGGRAPH, Feb. 2023, 13 pages.

Tretschk et al., Non-rigid Neural Radiance Fields: Reconstruction and Novel View Synthesis of a Dynamic Scene from Monocular Video, Proceedings of the IEEE/CVF International Conference on Computer Vision, Oct. 2021, pp. 12959-12970.

Trippe et al., Conditional Density Estimation with Bayesian Normalising Flows, Available online at: https://arxiv.org/pdf/1802.04908. pdf, Feb. 14, 2018, 12 pages.

Tutte, How to Draw a Graph, Proceedings of the London Mathematical Society, vol. 3, No. 13, Jan. 1963, pp. 743-767.

Wang et al., Tracking Everything Everywhere All at Once, Available online at: https://arxiv.org/pdf/2306.05422.pdf, Sep. 12, 2023, pp. 1-15.

Weng et al., HumanNeRF: Free-Viewpoint Rendering of Moving People from Monocular Video, Proceedings of the IEEE/CVF conference on computer vision and pattern Recognition, Jun. 2022, pp. 16210-16220.

Wu et al., 4D Gaussian Splatting for Real-time Dynamic Scene Rendering, Available online at: https://arxiv.org/pdf/2310.08528. pdf, Dec. 7, 2023, pp. 1-14.

Wu et al., Learning to Generate 3D Shapes from a Single Example, ACM Transactions on Graphics, vol. 41, No. 6, Dec. 2022, 19 pages.

Xu et al., Deforming Radiance Fields with Cages, European Conference on Computer Vision, Nov. 2022, pp. 1-17.

Xu et al., DeSRF: Deformable Stylized Radiance Field, In Proceedings of the Institute of Electrical and Electronics Engineers/CVF Conference on Computer Vision and Pattern Recognition, Jun. 2023, pp. 709-718.

Xu et al., Gradient Domain Mesh Deformation-A Survey, Journal of Computer Science and Technology, vol. 24, No. 1, Mar. 2009, pp. 6-18.

Xu et al., H-NeRF: Neural Radiance Fields for Rendering and Temporal Reconstruction of Humans in Motion, Available Online at: https://arxiv.org/pdf/2110.13746.pdf, Nov. 2, 2021, pp. 1-19.

Xu et al., Predicting Animation Skeletons for 3D Articulated Models via Volumetric Nets, International Conference on 3D Vision (3DV), Available online at: https://people.cs.umass.edu/~zhanxu/projects/AnimSkelVolNet/3DV19-skeleton-poster.pdf, Sep. 2019, 1 page.

Xu et al., Rignet: Neural Rigging for Articulated Characters, Association for Computing Machinery Transactions on Graphics, vol. 39, No. 4, Available online at: https://dl.acm.org/doi/10.1145/3386569. 3392379, Aug. 12, 2020, pp. 1-14.

Yang et al., FoldingNet: Point Cloud Auto-encoder via Deep Grid Deformation, In Proceedings of the IEEE Conference on Computer Vision and Pattern Recognition, Jun. 2018, pp. 206-215.

Yang et al., Geometry Processing with Neural Fields, 35th Conference on Neural Information Processing Systems, Nov. 10, 2021, pp. 1-15.

Yang et al., NeuMesh: Learning Disentangled Neural Mesh-based Implicit Field for Geometry and Texture Editing, Available Online at: https://arxiv.org/pdf/2207.11911.pdf, Jul. 25, 2022, pp. 1-28.

Yang et al., PointFlow: 3D Point Cloud Generation with Continuous Normalizing Flows, In Proceedings of the IEEE/CVF International Conference on Computer Vision, Available online at: https://arxiv. org/pdf/1906.12320.pdf, Sep. 2, 2019, pp. 1-15.

Yifan et al., Neural Cages for Detail-Preserving 3D Deformations, In Proceedings of the Institute of Electrical and Electronics Engineers/CVF Conference on Computer Vision and Pattern Recognition (CVPR), Mar. 2020, pp. 75-83.

Yuan et al., NeRF-Editing: Geometry Editing of Neural Radiance Fields, In Proceedings of the Institute of Electrical and Electronics Engineers/CVF Conference on Computer Vision and Pattern Recognition (CVPR), May 2022, pp. 18353-18364.

Zhao et al., HumanNeRF: Efficiently Generated Human Radiance Field from Sparse Inputs, In Proceedings of the Institute of Electrical and Electronics Engineers/CVF Conference on Computer Vision and Pattern Recognition (CVPR), Jun. 2022, pp. 7743-7753.

* cited by examiner

Input NeRF

Deformed NeRF

206

Layer i     Layer i + 1     Layer i + 2

202

204

200

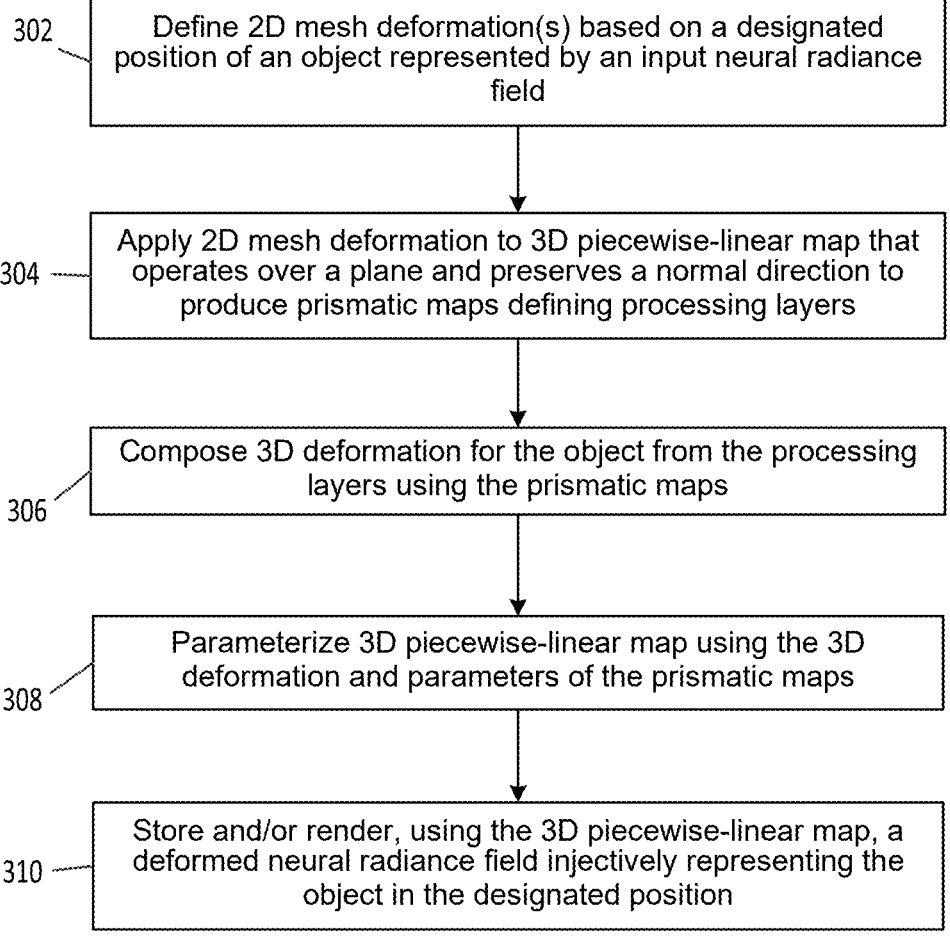

302 — Define 2D mesh deformation(s) based on a designated position of an object represented by an input neural radiance field 304 — Apply 2D mesh deformation to 3D piecewise-linear map that operates over a plane and preserves a normal direction to produce prismatic maps defining processing layers 306 — Compose 3D deformation for the object from the processing layers using the prismatic maps 308 — Parameterize 3D piecewise-linear map using the 3D deformation and parameters of the prismatic maps 310 — Store and/or render, using the 3D piecewise-linear map, a deformed neural radiance field injectively representing the object in the designated position

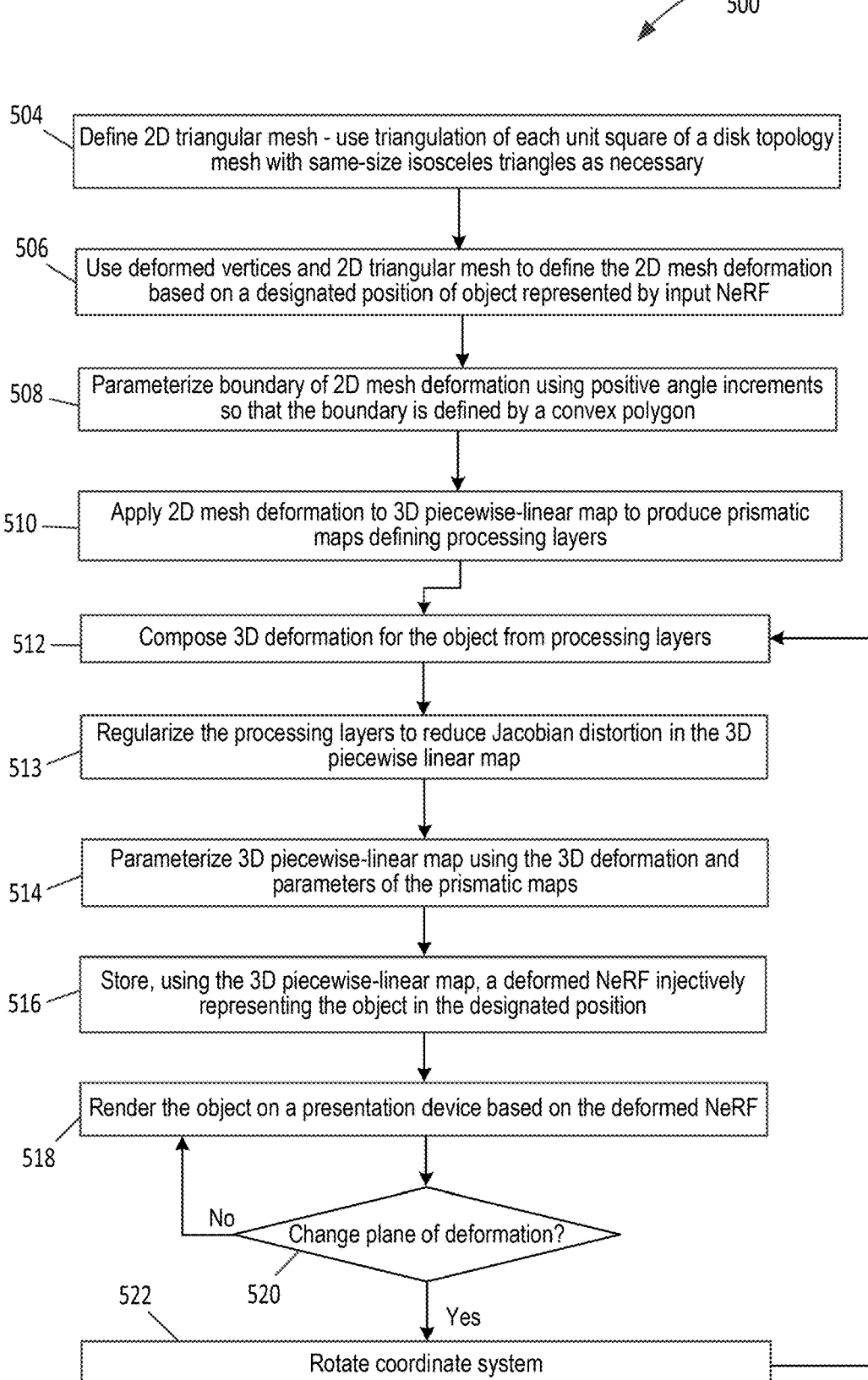

504 — Define 2D triangular mesh - use triangulation of each unit square of a disk topology mesh with same-size isosceles triangles as necessary 506 — Use deformed vertices and 2D triangular mesh to define the 2D mesh deformation based on a designated position of object represented by input NeRF 508 — Parameterize boundary of 2D mesh deformation using positive angle increments so that the boundary is defined by a convex polygon 510 — Apply 2D mesh deformation to 3D piecewise-linear map to produce prismatic maps defining processing layers 512 — Compose 3D deformation for the object from processing layers 513 — Regularize the processing layers to reduce Jacobian distortion in the 3D piecewise linear map 514 — Parameterize 3D piecewise-linear map using the 3D deformation and parameters of the prismatic maps 516 — Store, using the 3D piecewise-linear map, a deformed NeRF injectively representing the object in the designated position 518 — Render the object on a presentation device based on the deformed NeRF 520 — Change plane of deformation?

No

Yes

522 — Rotate coordinate system

Figures 6, 7:
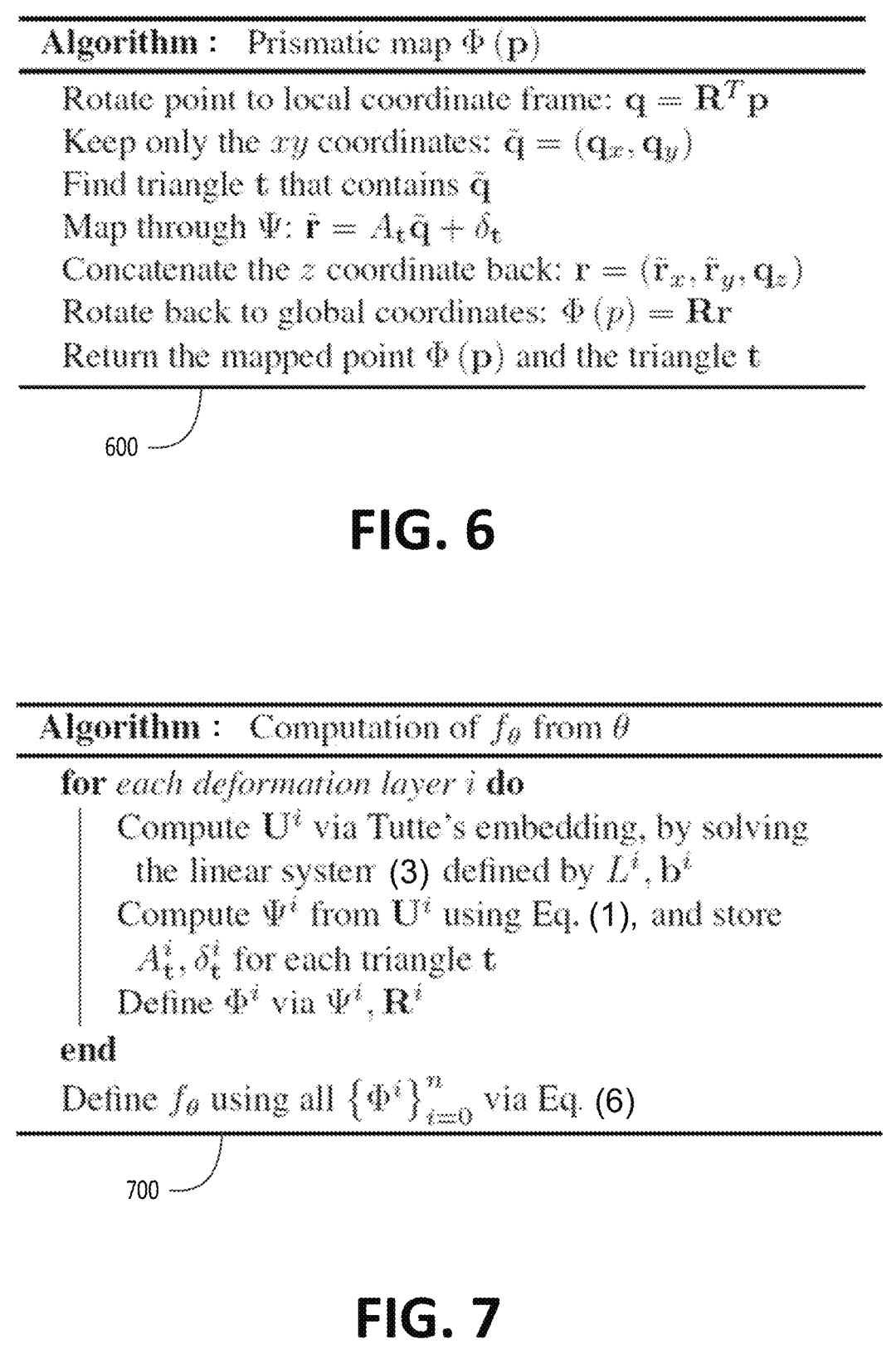

Algorithm :   Prismatic map $\Phi\left(\mathbf{p}\right)$

---

Rotate point to local coordinate frame: $\mathbf{q} = \mathbf{R}^T \mathbf{p}$

Keep only the $xy$ coordinates: $\bar{\mathbf{q}} = (\mathbf{q}_x, \mathbf{q}_y)$ Find triangle $t$ that contains $\bar{\mathbf{q}}$ Map through $\Psi$: $\bar{\mathbf{r}} = A_t \bar{\mathbf{q}} + \delta_t$ Concatenate the $z$ coordinate back: $\mathbf{r} = (\bar{\mathbf{r}}_x, \bar{\mathbf{r}}_y, \mathbf{q}_z)$ Rotate back to global coordinates: $\Phi\left(p\right) = \mathbf{R}\mathbf{r}$ Return the mapped point $\Phi\left(\mathbf{p}\right)$ and the triangle $t$

Algorithm :   Computation of $f_\theta$ from $\theta$

--- for *each deformation layer $i$* do

Compute $\mathbf{U}^i$ via Tutte's embedding, by solving the linear system (3) defined by $L^i, \mathbf{b}^i$ Compute $\Psi^i$ from $\mathbf{U}^i$ using Eq. (1), and store $A_t^i, \delta_t^i$ for each triangle $t$ Define $\Phi^i$ via $\Psi^i, \mathbf{R}^i$ end

Define $f_\theta$ using all $\left\{\Phi^i\right\}_{i=0}^{n}$ via Eq. (6)

INJECTIVE 3D DEFORMATIONS BASED ON 2D MESH DEFORMATIONS

TECHNICAL FIELD

The present disclosure generally relates to three-dimensional (3D) computer modeling. More specifically, but not by way of limitation, the present disclosure relates to techniques for providing injective deformation of a 3D model of an object using a combination of two-dimensional (2D) deformations to provide both accuracy and computational efficiency in rendering the 3D model with the deformation.

BACKGROUND 3D modeling software applications are used in a number of different fields. For example, such applications may be used to create models of actual objects for marketing purposes. 3D modeling may also be employed to render realistic objects for placement in images for video games, television programs, movies, training simulators, or virtual reality attractions at amusement parks. Realistic deformation of a 3D model can be used to create movement or provide views of various positions of the object.

SUMMARY

Certain aspects and features of the present disclosure relate to providing injective 3D deformations based on 2D mesh deformations, according to certain embodiments. For example, a method involves defining at least one 2D mesh deformation based on a designated position of an object represented by an input neural radiance field. The method also involves applying the 2D mesh deformation(s) to a 3D piecewise-linear map that operates over a plane and preserves a normal direction to produce prismatic maps. The prismatic maps define layers. The method further involves composing a 3D deformation for the object from the layers using the prismatic maps, and parameterizing the 3D piecewise-linear map using the 3D deformation and parameters of the prismatic maps. The method additionally involves storing or rendering, using the 3D piecewise-linear map, a deformed neural radiance field injectively representing the object in the designated position.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where:

FIG. 3 is a flowchart of an example of a process for providing injective 3D deformations based on 2D mesh deformations, according to some embodiments.

FIG. 5 is a flowchart of another example of a process for providing injective 3D deformations based on 2D mesh deformations, according to some embodiments.

FIG. 6 is an example computer algorithm for prismatic mapping used to provide injective 3D deformations based on 2D mesh deformations, according to certain embodiments.

FIG. 7 is an example computer algorithm for parameterizing a 3D piecewise linear map to provide injective 3D deformations based on 2D mesh deformations, according to certain embodiments.

Figure 1:
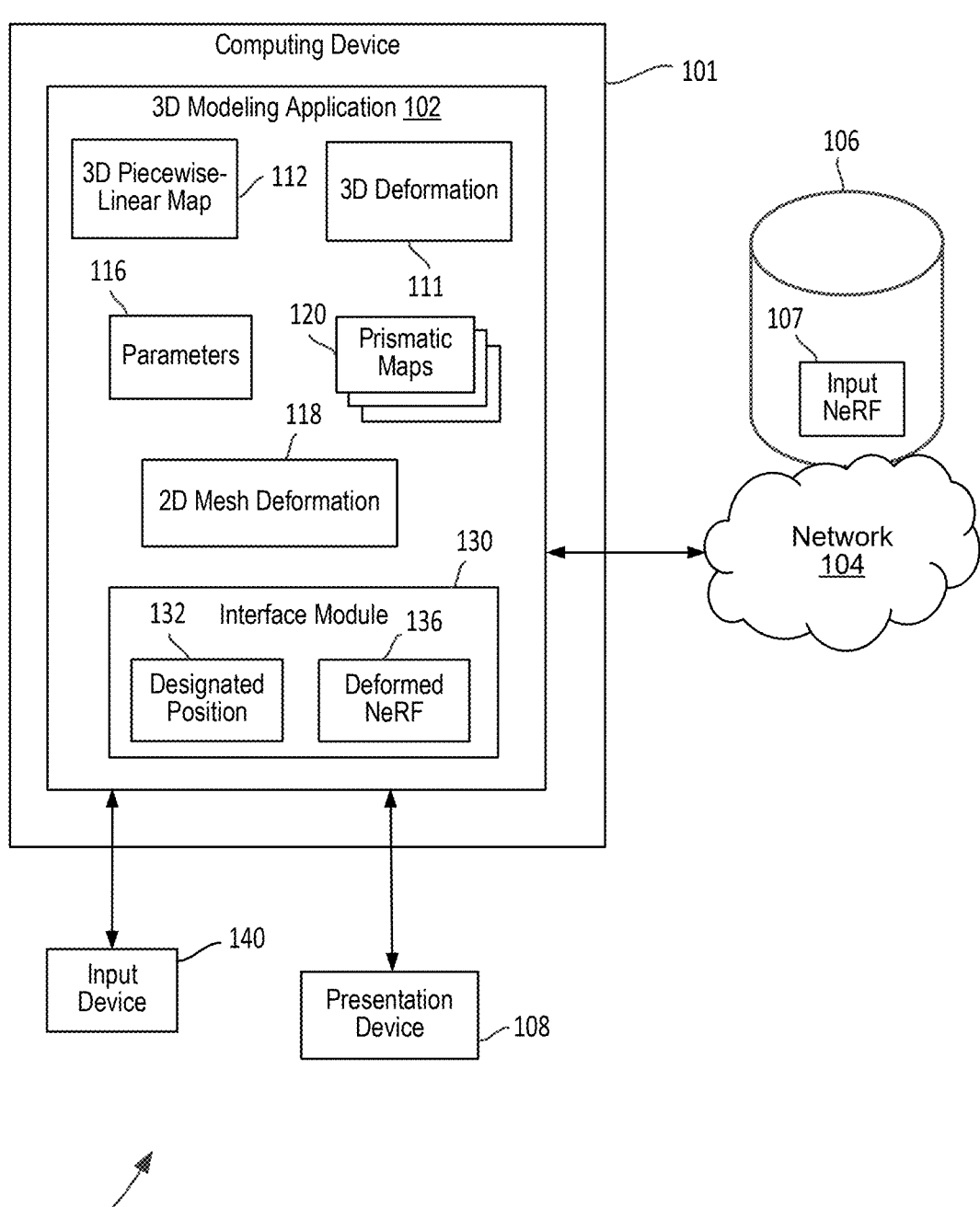
FIG. 1 is a diagram showing an example of a computing environment for providing injective 3D deformations based on 2D mesh deformations, according to certain embodiments.

DETAILED DESCRIPTION 3D modeling software applications may be used to create models of objects. The models can in turn be used to produce drawings or computer files for rendering realistic objects, or for objects in images for video games, television programs, movies, training simulators, or virtual reality attractions at amusement parks, just to name a few examples. In some applications, it is important for a designer to be able to deform the graphical representation of an object while maintaining a one-to-one correspondence between the various points of the image before and after deformation, so that the rendered image does not overlap or intersect itself. This property is sometimes referred to as injectivity, and it is a prerequisite to maintaining realistic positioning during movement of a graphical object.

Current methods of providing injective deformation of 3D graphical objects are either computationally expensive, require manual correction, or do not lend themselves to use in machine learning applications. For example, triangular or tetrahedral mesh representations can be used, wherein deformation is accomplished by modifying the position of each vertex in the mesh. Such representations can be computationally efficient, but cannot be readily learned by neural networks or other AI techniques, and may not be injective, leading to rendering artifacts that must be manually removed. Representation using injective maps of an object can be used to apply deformations and such representations lend themselves to use in machine learning; however, working with such representations can be slow due do computational complexity and deformations can also be computationally unstable, leading to software crashes.

Aspects and features of the present disclosure provide injective 3D deformations by using 2D injective maps. A computational representation for 3D injective deformations combines the geometric representation of mesh-based deformations with the standard deep-learning approach of functional composition. Sequentially composing multiple 2D mesh deformations over different 3D planes captures complex 3D deformations based on an input neural radiance field (NeRF) accurately, while simultaneously using mesh deformations to achieve numerical stability, and computational efficiency. By reducing each layer to two dimensions, injective mesh deformations and layer-based embeddings can provide a differentiable parameterization of all injective mesh deformations in a convex domain, enabling unconstrained learning and optimization. Composing multiple 2D injective deformations from different rotational viewpoints can define a family of injective volumetric 3D deformations to output an injective representation, for example, a deformed NeRF that represents an object in a specified position.

For example, a 3D modeling application can be used by a graphics designer to create, edit, and render 3D objects, and to apply a designated position to a 3D object represented by an NeRF. The graphics designer may select and display the object on a presentation device, and use a mouse, stylus, or other input device to input the desired position of the object. To "move" the object into the designated position requires that the original NeRF be accurately deformed. The 3D modeling application defines one or more 2D mesh deformations based on the designated position of the object and applies the 2D mesh deformation to a 3D piecewise-linear map that operates over a plane and preserves a normal direction to produce prismatic maps that define layers. The prismatic maps are combined into a 3D deformation for the object and the 3D piecewise-linear map is parameterized using the 3D deformation and parameters of the prismatic maps. Optionally, the layers can be regularized to reduce distortion that might otherwise be present in the 3D piece-wise-linear map.

The 3D modeling application can produce an accurately deformed NeRF, which injectively represents the object in the designated position The deformed NeRF can be stored and used to render the deformed object. Optionally, a desired plane of deformation can be specified, and the coordinate system can be rotated to apply the 3D deformation in the desired plane. In some embodiments, a change in this desired plane of deformation may be specified by input from the graphics designer, and the stored NeRF can be recomputed and re-rendered.

In some examples, a 2D triangular mesh can be produced, if needed, by triangulating unit squares of a disk-topology mesh using same-size isosceles triangles. The 2D injective mesh deformation space can be parameterized using Tutte embeddings (a "TutteNet") to provide deformed vertices that define the 2D mesh deformation using the 2D triangular mesh. A sigmoid and scaling function can be applied to input parameters for the Tutte embedding. A boundary of the 2D mesh deformation can be parameterized using positive angle increments so that the boundary is a convex polygon.

FIG. 1 is a diagram showing an example of a computing environment 100 that provides injective 3D deformations based on 2D mesh deformations, according to certain embodiments. The computing environment 100 includes a computing device 101 that executes a 3D modeling application 102, a presentation device 108 that is controlled based on the 3D modeling application 102, and an input device 140 that receives input commands. These input commands may include input specifying a designated pose or position for an object that causes the 3D modeling application 102 to produce a deformed NeRF based on an input NeRF, according to certain embodiments. Such a 3D modeling application may also provide functions including painting, designing, material transfer, and working with surface textures of the objects to be rendered.

The computing device 101 can be communicatively coupled to other computing devices (not shown) using network 104. Other computing devices may include virtual or physical servers where NeRF files or other files may be stored, or where updates to the 3D modeling application may be stored and distributed to computing devices 101. In this example, a storage device 106 is connected to network 104, and includes an input NeRF 107. Such an input NeRF 107 may be provided for display to a user on presentation device 108 in order to indicate a designated position that requires deformation of an image of the object. The 3D modeling application 102 includes a stored 3D deformation 111, which may be composed based on multiple prismatic maps 120. 3D modeling application 102 in this example also includes parameters 116, some of which can be used in parameterizing a 3D piecewise-linear map 112. Other parameters 116 can be used to parameterize a 2D injective mesh deformation space using Tutte embeddings to produce a 2D mesh deformation 118.

In the example of FIG. 1, 3D modeling application 102 also includes an interface module 130. In some embodiments, 3D modeling application 102 can produce a stored and/or rendered deformed NeRF 136 corresponding to the 3D object deformed as indicated by designated position 132, which may be provided by the graphics designer through input device 140. In some embodiments, the 3D modeling application 102 uses the input device 140, for example, a keyboard, mouse, or trackpad, to select and/or receive input NeRF 107 as well as to indicate designated position 132 for the object. Input device 140 can also be used to receive input directed to storing a file of the deformed NeRF for future use.

Figure 2:
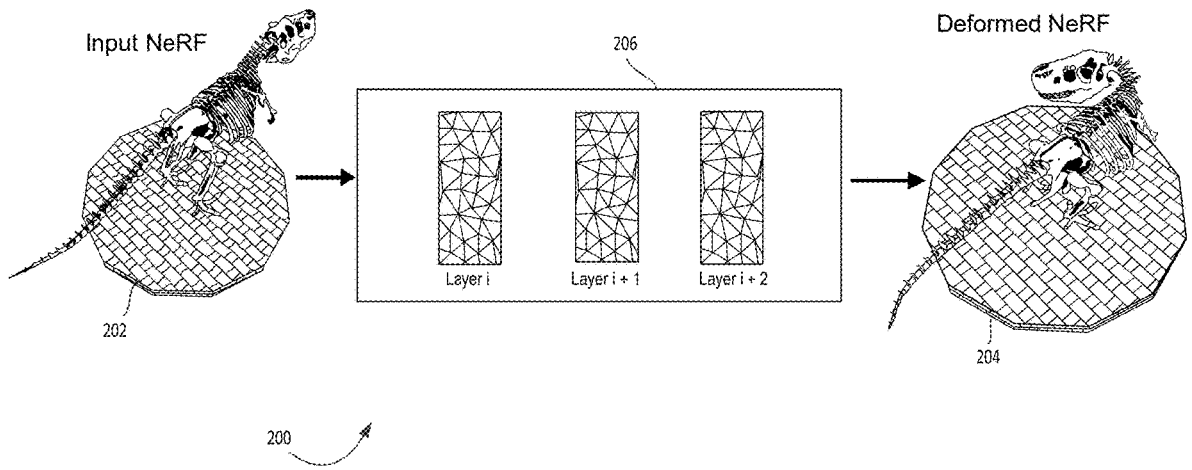
FIG. 2 is a diagram of an example of a 3D deformation of an object, according to certain embodiments.

FIG. 2 is a diagram of an example 200 of a 3D deformation of an object, according to certain embodiments. An input NeRF 202 represents an object, in this case, a Tyrannosaurus rex (T-Rex). This input NeRF is processed to apply a deformation to implement a selected or designated pose, resulting in deformed NeRF 204, in which the T-Rex has crouched down and looked back. The input NeRF is processed by a network 206 of layers. For example, network 206 can be implemented by Tutte embeddings for layers i, i+1, and i+2, referred to as a TutteNet, and the layers can be mapped by prismatic maps. A prismatic map is a lifting of a 2D mesh deformation into a 3D piecewise-linear map. Because the technique described herein uses 2D injective methods, in order to do a 3D mapping of the points of the T-Rex, multiple 2D planes are placed around the T-Rex. Each layer in network 206 represents one of the 2D planes placed around the T-Rex.

Elastically deforming a NeRF based on user-designated positioning of the head (turned) tail (bent) and body (lowered), the TutteNet optimizes the degrees of freedom to minimize the elastic energy of the deformation, and guarantees an injective (one-to-one) deformation of the ambient 3D space surrounding the T-Rex, ensuring that the NeRF is rendered correctly without artifacts by enabling pulled back points for viewing directions from within deformed space. Each layer "views" the T-Rex over a different 2D plane (in this case, alternating between the three main axes in a tri-plane manner). In each layer within TutteNet 206, the T-Rex is enveloped with a regular 2D mesh of a unit square to provide a 2D injective mesh deformation space. The 2D mesh is deformed using the layer's optimizable parameters, which define the Tutte embeddings. This process defines an injective 2D piecewise-linear map, which can be applied to the 3D T-Rex, without modifying the normal direction to the plane, resulting in an injective 3D deformation using a 3D piecewise-linear map. Composition of these layers yields the final expressive 3D injective deformation, which can be used to create a deformed NeRF 204 for rendering or other processing.

FIG. 3 is a flowchart of an example of a process 300 for injective 3D deformations based on 2D mesh deformations, according to some embodiments. In this example, a computing device carries out the process by executing suitable program code, for example, computer program code executable to provide 3D graphics function, such as 3D modeling application 102. At block 302, the computing device running the 3D modeling application defines at least one 2D mesh deformation based on the designated position of an object represented by an input neural radiance field.

Staying with FIG. 3, the 2D mesh deformation can be defined using Tutte embeddings to envelop the NeRF in a 2D mesh for each prismatic map, providing deformed vertices. A Tutte embedding is a method for computing injective 2D mesh mappings for meshes with disk topology (i.e., having one loop of boundary vertices). A Tutte embedding provides the capability to embed any part of a surface or any mesh onto a plane based on the weight of its Laplacian. The deformed vertices can in turn be used to define the 2D mesh deformation.

Continuing with FIG. 3, block 304, the computing device applies the 2D mesh deformation to a 3D piecewise-linear map to produce one or more prismatic maps. A prismatic map, as the term is used herein, is a building block, which in these examples defines one layer of the computational architecture used to provide the injective 3D deformation. As an example, the layers within network 206 in FIG. 2 can correspond to prismatic maps. A prismatic map in the examples herein is a lifting of the 2D mesh deformation $\Psi$ into a 3D piecewise-linear map that operates over a plane and preserves the normal direction. A prismatic map corresponds to a 2D plane that surrounds the object of interest.

For purposes of this disclosure, it can be assumed that a 2D triangular mesh M with triangles T and vertices V embedded in $\mathbb{R}^2$ (2D space) is used. M can be any disk-topology mesh. A unit square, $\Omega=[-1,1]^2$, can be triangulated with a regular triangulation of same-size isosceles triangles. At block 306 of process 300 in FIG. 3, the computing device composes a 3D deformation for the object from the prismatic maps for the points of an object to be deformed. At block 308, the computing device parameterizes the 3D piecewise-linear map using the 3D deformation and the parameters of the prismatic maps. At block 310, the computing device stores or renders, using the 3D piecewise-linear map, a deformed neural radiance field injectively representing the object in the designated position.

Figure 4:
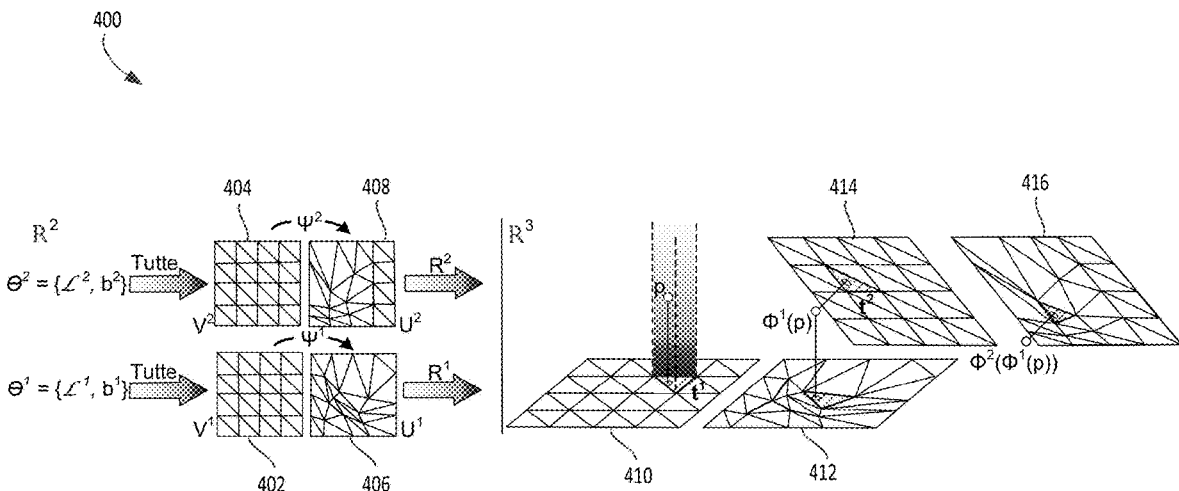
FIG. 4 is an example graphical representation of mapping a point as part of producing a 3D piecewise linear map to provide injective 3D deformations based on 2D mesh deformations, according to certain embodiments.

FIG. 4 is a graphical representation 400 of mapping a point as part of producing a 3D piecewise linear map to provide injective 3D deformations based on 2D mesh deformations, according to certain embodiments. The technique described below provides a deformation of a 3D point while working in two dimensions by projecting the 3D point on a plane, and projecting orthogonally towards the plane from a certain distance. A plane is flat representation that defines directions in space. FIG. 4 visualizes a process of mapping a given point p inside the volume of the object to be deformed for a two-layer TutteNet, i∈{1, 2}. Learnable parameters $\theta^i$, including mesh-Laplacian $L^i$ and the boundary conditions $b^i$, define a 2D deformation of square mesh M, such as shown in plane 402 and plane 404, using Tutte embedding. $\Psi^i$ is embedded in three dimensions according to the local coordinates $R^i$ to define a 3D deformation, $\Phi^i$, as in deformation 406 and deformation 408. In practice, plane 402 and plane 404 can be deformed, starting from a portion of a surface, which in this example is the regular square grid shown. Laplacian weights can be determined for every edge of the grid. In some examples, these weights are the variables that are optimized.

Because the technique described herein uses 2D injective methods, to do 3D mapping, the points of an object, multiple 2D planes are placed around the object as shown in FIG. 2. For each iteration in this example, only two coordinates on a given plane are changed. Then the plane's orientation is changed. Plane 414 and plane 416 represent changes in orientation of planes 410 and 412. In this example, coordinates are changed for only one plane at a time. For instance, for the xy plane, only xy coordinates change, while the z value is retained. In the next step, a yz coordinate can be changed while retaining the x coordinate, and so on. In FIG. 4, the 3D point p is projected onto the grid at point $t^1$ in plane 410 as an orthographic projection. This point is deformed into $t^2$ based on the deformation of a 2D grid represented by plane 414 using any of various available techniques. In the examples herein, Tutte embedding is used. When $t^1$ is deformed into $t^2$, a deformation for point p is implicitly created by keeping the coordinates that are orthogonal to the plane constant.

Continuing with FIG. 4, based on these variables, a linear system that describes where the position of each vertex should be located in order to satisfy the constraints of the Laplacian is solved. Given a point p that is projected to the local coordinates of $\Phi^1$, the point lands on triangle $t^1$ of plane 410. $\Phi^1$ defines an affine map over the infinite prism of $t^1$, represented by shading, mapping p in plane 412 to $\Phi^1(p)$. The resulting $\Phi^1(p)$ is projected onto the local coordinates of $\Psi^2$, landing on triangle $t^2$ in plane 414, from which it is mapped onto plane 416, with the affine map $\Phi^2$ defined over the infinite prism of $t^2$ by solving the Laplacian described above.

In the above example, the process uses a 2D triangular mesh M with triangles T and vertices V embedded in $\mathbb{R}^2$. M can be any disk-topology mesh, for example, a unit square, $\Omega=[-1,1]^2$, can be used, and it can be triangulated with a regular triangulation of same-size isosceles triangles. Considering 2D piecewise-linear maps $\Psi: M \rightarrow \mathbb{R}^2$ of this mesh, meaning the map is affine over each triangle t∈T, $$\Psi\mid_t (p) \equiv A_t p + \delta_t, \qquad (1)$$

for some $A_t \in \mathbb{R}^{2\times2}$, $\delta_t \in \mathbb{R}^2$. Note that this map can describe any point p∈Ω and not just the vertices of a mesh. The gradient of a map at point p, denoted $D_p\Psi$, is called the Jacobian. For piecewise-linear maps, the Jacobian is constant over each triangle t and is the linear transformation $D_t\Psi=A_t$. To define a continuous piecewise linear map $\Psi$, it suffices to define deformed vertex positions $$U = \{u_i\}_{i=0}^{|V|},$$

assigning position $u_i \in \mathbb{R}^2$ to each vertex $v_i \in V$ to define the map via $\Psi(v_i)=u_i$. Given $u_i$, the Jacobian can be obtained by solving the linear equation $$A_t v_i + \delta_t = u_i, i \in t. \qquad (2)$$

With respect to $A_t$; the resulting small 6×6 linear equations can be inverted once at initialization of training and/or optimization.

A Tutte embedding is a process for computing injective 2D mesh mappings for meshes with disk topology. A disk topology for purposes of this disclosure is a topology having one loop of boundary vertices. Given a mesh-Laplacian matrix L, defined by assigning some positive scalar $L_{ij} \in \mathbb{R}^+$ to each edge (i, j) of the mesh M, along with a sequence of 2D points $b_1, \ldots, b_k \in \mathbb{R}^2$ that lie on a convex polygon, a Tutte embedding computes deformed vertex positions $$U = \{u_i\}_{i=0}^{|V|}$$

by solving the sparse linear system defined via:

$$\sum_j L_{ij}(u_j - u_i) = 0 \text{ for all interior } v_i \quad (3)$$

$u_i = b_i$ for all boundary $v_i$.

While Tutte embedding is guaranteed to be injective in two dimensions, it is not injective in three dimensions.

In example embodiments, an optimizable family of injective deformations $f_\theta$ of 3D volumetric space leverages mesh deformations. Instead of parameterizing injective 3D mesh deformations TutteNet is used to define the 3D deformation through the composition of 2D injective mesh deformations. Assuming for illustrative purposes that there is one injective 2D mesh deformation, $\Psi:M \leftrightarrow \mathbb{R}^2$, the building block constituting one layer of the processing architecture described herein is the prismatic map. As previously discussed, the prismatic map is a lifting of the 2D mesh deformation $\Psi$ into a 3D piecewise-linear map that operates over a plane and preserves the normal direction. Specifically, let $p \in \mathbb{R}^3$ be a 3D point (where $\mathbb{R}^3$ is 3D space), and define $$\tilde{\psi}(p_x, p_y, p_z) \triangleq \psi(p_x, p_y), p_z, \quad (4)$$

i.e., $\tilde{\psi}$ acts on the xy coordinates of each point and preserves the z coordinate. By rotating the coordinate system by a 3D rotation $R \in SO(3)$ we can apply the deformation on any desired plane instead of on the main axes:

$$\phi(p) \triangleq R\tilde{\psi}(R^T p). \quad (5)$$

A process of mapping through $\Phi$ can be carried about by the algorithm discussed below with respect to FIG. 6. Composing multiple $\Phi^i$ (defined over different planes $R^i$ and with different $\Psi^i$) yields the final 3D deformation f, $$f = \phi^k \circ \phi^{k-1} \ldots \circ \phi^0 \mid . \quad (6)$$

The reduction of the 3D injective problem to 2D subproblems enables the technique to take advantage of recent advances in 2D injective mesh deformations. Originally designed for generative 2D techniques, a parameterization of all 2D injective deformations of a given mesh can be accomplished via Tutte embedding.

FIG. 5 is a flowchart of another example of a process 500 for providing injective 3D deformations based on 2D mesh deformations, according to some embodiments. In this example, a computing device carries out the process by executing suitable program code, for example, computer program code for an application such as 3D modeling application 102, based on principles of the example shown in FIG. 4. At block 504, the computing device defines a 2D triangular mesh. If necessary, the computing device can use triangulation of each unit square of a disk topology mesh with same-size isosceles triangles. At block 506, the computing device uses deformed vertices and a 2D triangular mesh to define the 2D mesh deformation based on a designated position of the object represented by the input NeRF. For example, see the 2D triangular meshes shown in plane 402 and plane 404 of FIG. 4. The injective 2D mesh deformation space $\Psi:M \rightarrow \mathbb{R}^2$ is parameterized at block 508; the computing device parameterizes the boundary of the 2D mesh deformation using positive angle increments so that the boundary is defined by a convex polygon. To ensure that $\{b_i\}$ form a convex polygon, the computing device parameterizes using positive angle increments $\alpha_i > 0$, $\Sigma \alpha_i = 2\pi$, and define the angle $$\beta_j = \sum_{i=1}^j \alpha_i.$$

$b_i$ as the intersection of the line at angle $\beta_i$ with the unit square. Hence, b is parameterized by $\alpha$, but for the sake of clarity, the parameters $\alpha$ are referred to as b everywhere else.

At block 510 of process 500 in FIG. 5, the computing device applies the 2D mesh deformation to a 3D piecewise-linear map that operates over a plane and preserves a normal direction to produce prismatic maps. Entries of the Laplacian Lij and the boundary conditions $b_i$ can be used as optimizable and/or learnable parameters, which in turn produce the deformed vertices U of the 2D mesh through Tutte embedding by solving the linear system of Equation (3) with respect to L, b. In the disclosed example, this covers all possible piecewise-linear maps of M with respect to the convex polygon b. The functions included in blocks 506-510 and discussed with respect to FIG. 5 can be used in implementing a step for producing a prismatic maps from an input neural radiance field representing an object.

A sigmoid and scaling function may be applied to input parameters for mapping layers and used to parameterize the 2D injective mesh deformation space to provide deformed vertices for the input NeRF. As an example, the input parameters can be provided for a Tutte embedding and the Tutte embedding can be used to parameterize the injective mesh deformation space. To keep all parameters positive and bounded, a sigmoid and scaling function can be applied to parameters before providing them to the Tutte layer, $x' = \text{sigmoid}(x)(1 - 2\epsilon) + \epsilon$ with $\epsilon = 0.2$ for L and $\epsilon = 0.1$ for b.

Continuing with FIG. 5, at block 512, the computing device composes the 3D deformation for the object from the prismatic maps. At block 514, the computing device parameterizes a 3D piecewise-linear map using the 3D deformation and parameters of the prismatic maps. The final 3D injective piecewise-linear map $f_\theta$ is thus parameterized by the parameters of all its prismatic maps: $\theta^i = \{L^i, b^i\}$, and the local coordinate system $R^i$. An algorithm for the computation of $f_\theta$ is discussed below and illustrated in FIG. 7. $\theta$ (and possibly $\{R^i\}$) can be directly optimized with respect to an objective, or otherwise predicted by a neural network-in both cases, the algorithm in FIG. 7 is run at each iteration, computing the loss and back-propagate gradients back to $\theta$, as all operations in the algorithm are differentiable.

At block 513 or process 500 in FIG. 5, the computing device can regularize the layers of the architecture to produce the final 3D piecewise-linear map. Regularization can reduce each layer's Jacobian distortion. An elastic energy can be defined to measure the Cauchy-Green strain tensor's deviation from the identity matrix I at a given point p for a given map g, $$E_g(p) = \|D_p g^T D_p g - I\|^2, \tag{7}$$

where $D_p g$ is the map's Jacobian. As opposed to functional representations, the layer's Jacobians are enumerable (one per triangle), enabling computation of the integral of E (as opposed to an approximation via sampling), by summing the energy over all Jacobians of the layer:

$$\mathcal{L}_{Reg} \stackrel{\Delta}{=} \int_{p \in \Omega} E_{\psi^i}(p) \equiv \sum_{t \in T} |t| E_{\psi^i}(t), \tag{8}$$

where $|t|$ is the area of t. The functions included in blocks 512-514 and discussed with respect to FIG. 5 can be used in implementing a step for providing a three-dimensional (3D) piecewise-linear map based on the prismatic maps.

Staying with FIG. 5, at block 516, the computing device stores, using the 3D piecewise-linear map, a deformed NeRF injectively representing the object in the designated position. At block 518, the object, as deformed, is optionally rendered on a presentation device, such as presentation device 108 of FIG. 1. At block 520, a determination is made as to whether to change the plane of deformation for the object. For example, a graphics designer may provide input using input device 140 of FIG. 1 to make such a change. If the determination is made to change the plane of deformation, the computing device rotates the coordinate system at block 522 in order to account for the change, and processing returns to block 512 to re-process and update the NeRF of the deformed object. Otherwise, no action new action is taken. In this example, the rendered object will continue to be displayed unless another change is made.

FIG. 6 is an example algorithm 600 for prismatic mapping used to provide injective 3D deformations based on 2D mesh deformations, according to certain embodiments. As discussed above with respect to FIG. 5, the building block that in this example constitutes one layer in of the processing architecture is the prismatic map, which is a lifting of the 2D mesh deformation Ψ into a 3D piecewise-linear map that operates over some plane and preserves the normal direction. The algorithm 600 summarizes the process. Composing multiple $\Phi^i$ defined over different planes with different mappings yields the final 3D deformation f.

FIG. 7 is an example computer algorithm 700 for parameterizing a 3D piecewise linear map to provide injective 3D deformations based on 2D mesh deformations, according to certain embodiments. As discussed above with respect to FIG. 5, the injective, 3D piecewise-linear map $f_\theta$ is parameterized by the parameters of all its prismatic maps. Algorithm 700 summarizes this process. θ (and possibly $\{R^i\}$) are directly optimized in this example with respect to an objective, or otherwise predicted by a neural network; in both cases, the algorithm 700 is run at each iteration, computing the loss and back-propagating gradients to θ. All operations in algorithm 700 are differentiable.

Two properties particularly relevant to learning 3D deformations are robustness and efficiency in dealing with a full Jacobian. Constructing f through composition of mesh deformations provides the disclosed technique with the following desirable properties: The representation of the deformation $f_\theta$ through the unconstrained parameters θ in turn allows straightforward gradient-based learning/optimization of those parameters. f is guaranteed to be an injective piecewise-linear map, so that the roles of $V^i$ and $U^i$ can be swapped to obtain the inverse as well as its Jacobian.

Computing the Jacobian requires 2n multiplications of small 3×3 matrices, where n is the number of layers. In comparison, some methods are designed to have efficient access to the determinant of the Jacobian, but require n multiplications of large, dense matrices to get a full Jacobian. The computational burden is even worse when second-order optimization is needed, such as when the Jacobians are involved in a loss. The technique described herein inherits the virtues of mesh-based deformation, such as numerically-stable computations and ability to represent diverse and elaborate deformations with ease, with its expressivity boosted by the ability to create deep compositions of these deformations. Numeric stability in this context is reflected by the ease with which code that is free from crashes can be produced for running calculations. Each Tutte layer relies on a single well-behaved linear system, solved with a constant memory footprint and speed. In contrast, some techniques rely on numerical integration using a neural network, with hard-to-tune trade-offs between accuracy, speed and memory consumption.

Figure 8:
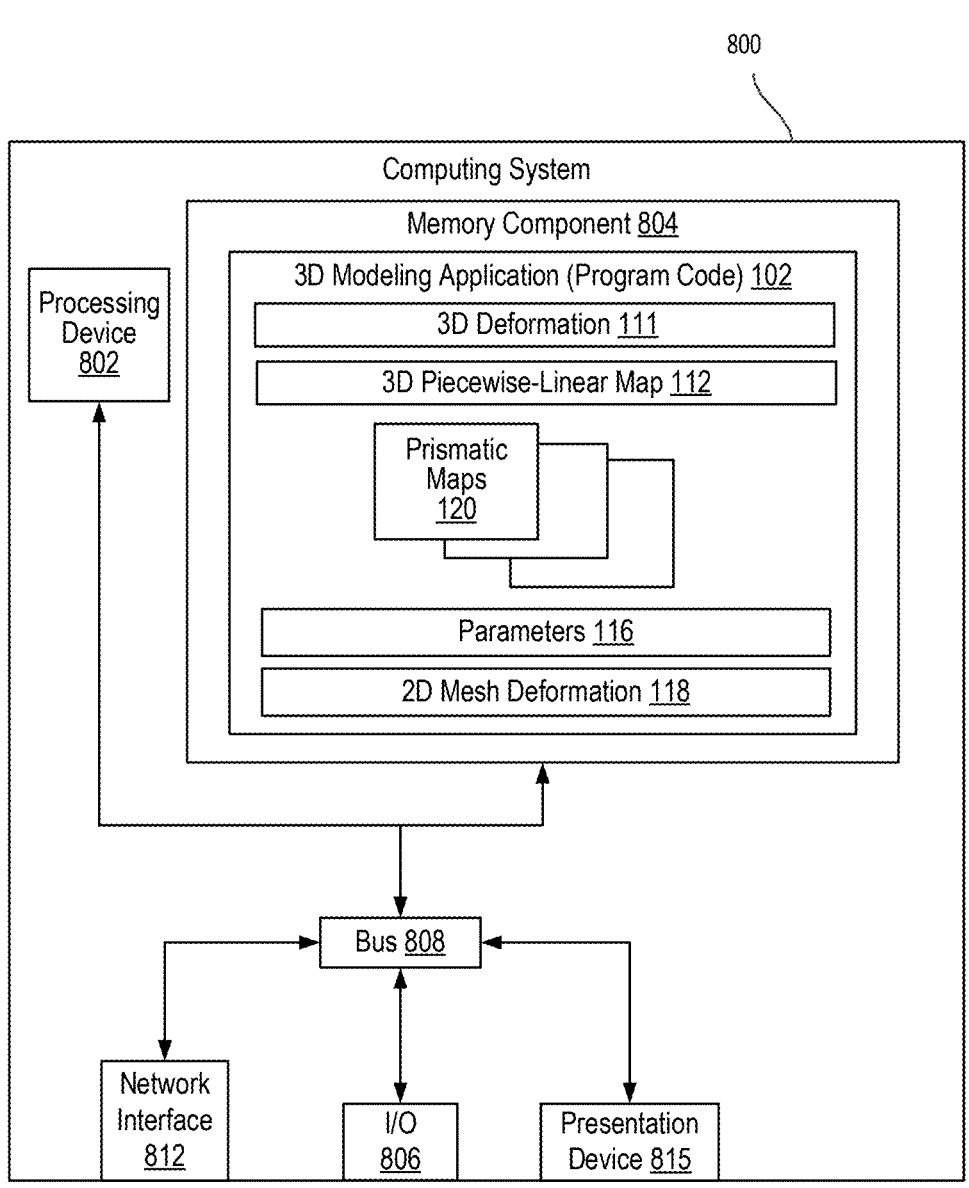
FIG. 8 is a diagram of an example of a computing system that can provide injective 3D deformations based on 2D mesh deformations, according to certain embodiments.

FIG. 8 depicts a computing system 800 that executes the 3D modeling application 102 with the capability injective 3D deformations based on 2D mesh deformations, according to certain embodiments. System 800 includes a processing device 802 communicatively coupled to one or more memory components 804. The processing device 802 executes computer-executable program code stored in the memory component 804. Examples of the processing device 802 include a processor, a microprocessor, an application-specific integrated circuit ("ASIC"), a field-programmable gate array ("FPGA"), or any other suitable processing device. The processing device 802 can include any number of processing devices, including a single processing device. The memory component 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read executable instructions. The executable instructions may include processor-specific instructions generated by a compiler or an interpreter from code written in any suitable computer-programming language, including, for example, C, C++, C #, Visual Basic, Java, Python, Perl, and JavaScript.

Still referring to FIG. 8, the computing system 800 may also include a number of external or internal devices, for example, input or output devices. For example, the computing system 800 is shown with one or more input/output ("I/O") interfaces 806. An I/O interface 806 can receive input from input devices such input device 140 and provide output to output devices (not shown) for example, to render deformed 3D shapes. One or more buses 808 are also included in the computing system 800. The bus 808 communicatively couples one or more components of a respective one of the computing system 800.

The processing device 802 executes program code (executable instructions) that configures the computing system 800 to perform one or more of the operations described herein. The program code includes, for example, 3D modeling application 102 or other suitable applications that perform one or more operations described herein and/or to cause the processing device 802 to perform the operations. The program code may be resident in the memory component 804 or any suitable computer-readable medium and may be executed by the processing device 802 or any other suitable processing device. Memory component 804, at least during operation of the computing system, includes executable portions of the 3D modeling application or stored data structures for use by the 3D modeling application, for example, 3D deformation 111, 2D mesh deformation 118, parameters 116, 3D piecewise-linear map 112, and/or interface module 130. Processing device 802 can access portions as needed. Memory component 804 is also used to store prismatic maps 120, as well as other information or data structures, shown or not shown in FIG. 8.

The system 800 of FIG. 8 also includes a network interface device 812. The network interface device 812 includes any device or group of devices suitable for establishing a wired or wireless data connection to one or more data networks. Non-limiting examples of the network interface device 812 include an Ethernet network adapter, a wireless network adapter, and/or the like. The system 800 is able to communicate with one or more other computing devices (e.g., another computing device executing other software, not shown) via a data network (not shown) using the network interface device 812. Network interface device 812 can also be used to communicate with network or cloud storage used as a repository for input NeRF files that can be input to the 3D modeling application 102. Such network or cloud storage can also include updated or archived versions of the 3D modeling application for distribution and installation.

Staying with FIG. 8, in some embodiments, the computing system 800 is also communicatively coupled to the presentation device 815 depicted in FIG. 8. A presentation device 815 can include any device or group of devices suitable for providing visual, auditory, or other suitable sensory output. In examples, presentation device 815 displays rendered 3D shapes including those based on a deformed NeRF. Non-limiting examples of the presentation device 815 include a touchscreen, a monitor, a separate mobile computing device, etc. In some aspects, the presentation device 815 can include a remote client-computing device that communicates with the computing system 800 using one or more data networks. System 800 may be implemented as a unitary computing device, for example, a notebook or mobile computer. Alternatively, as an example, the various devices included in system 800 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "accessing," "generating," "processing," "computing," and "determining" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device. The methods described herein can also be implemented in a web browser.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting. The term "selectively" as applied to an operation that is part of a process refers to the operation being performed or not depending on a precondition, state, or circumstance.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
defining at least one two-dimensional (2D) mesh deformation based on a designated position of an object represented by an input neural radiance field;
applying the at least one 2D mesh deformation to a three-dimensional (3D) piecewise-linear map that operates over a plane and preserves a normal direction to produce a plurality of prismatic maps defining plurality of layers;
composing a 3D deformation for the object from the plurality of layers using the plurality of prismatic maps;
parameterizing the 3D piecewise-linear map using the 3D deformation and parameters of the plurality of the prismatic maps; and
storing, using the 3D piecewise-linear map, a deformed neural radiance field injectively representing the object in the designated position.

2. The method of claim 1, further comprising rendering the object, as deformed, on a presentation device.

3. The method of claim 2, further comprising:
determining a desired plane of deformation; and
rotating a coordinate system to apply the 3D deformation in the desired plane.

4. The method of claim 1, further comprising:
parameterizing a 2D injective mesh deformation space using a Tutte embedding to provide deformed vertices; and
using the deformed vertices to define the at least one 2D mesh deformation.

5. The method of claim 1, further comprising regularizing the plurality of layers to reduce Jacobian distortion of the 3D piecewise-linear map.

6. The method of claim 1, further comprising parameterizing a boundary of the at least one 2D mesh deformation using positive angle increments so that the boundary is defined by a convex polygon.

7. The method of claim 1, further comprising:
selectively triangulating each unit square of a disk-topology mesh using same-size isosceles triangles to produce at least one 2D triangular mesh; and
using the at least one 2D triangular mesh to define the at least one 2D mesh deformation.

8. A system comprising:
a memory component including a designated position of an object and an input neural radiance field representing the object; and
a processing device coupled to the memory component to perform operations comprising:
defining at least one two-dimensional (2D) mesh deformation based on the designated position and the input neural radiance field;
applying the at least one 2D mesh deformation to a three-dimensional (3D) piecewise-linear map that operates over a plane and preserves a normal direction to produce a plurality of prismatic maps defining a plurality of layers;
composing a 3D deformation for the object from the plurality of layers using the plurality of prismatic maps;
parameterizing the 3D piecewise-linear map using the 3D deformation and parameters of the plurality of the prismatic maps; and
storing, using the 3D piecewise-linear map, a deformed neural radiance field injectively representing the object in the designated position.

9. The system of claim 8, wherein the processing device additionally performs an operation of rendering the object, as deformed, on a presentation device.

10. The system of claim 9, wherein the processing device additionally performs operations comprising:
determining a desired plane of deformation; and
rotating a coordinate system to apply the 3D deformation in the desired plane.

11. The system of claim 8, wherein the processing device additionally performs operations comprising:
parameterizing a 2D injective mesh deformation space using a Tutte embedding to provide deformed vertices; and
using the deformed vertices to define the at least one 2D mesh deformation.

12. The system of claim 8, wherein the processing device additionally performs an operation of regularizing the plurality of layers to reduce Jacobian distortion of the 3D piecewise-linear map.

13. The system of claim 8, wherein the processing device additionally performs an operation of parameterizing a boundary of the at least one 2D mesh deformation using positive angle increments so that the boundary is defined by a convex polygon.

14. The system of claim 8, wherein the processing device additionally performs operations comprising:
selectively triangulating each unit square of a disk-topology mesh using same-size isosceles triangles to produce at least one 2D triangular mesh; and
using the at least one 2D triangular mesh to define the at least one 2D mesh deformation.

15. A non-transitory computer-readable medium storing executable instructions, which when executed by a processing device, cause the processing device to perform operations comprising:
a step for producing a plurality of prismatic maps from an input neural radiance field representing an object;
a step for providing a three-dimensional (3D) piecewise-linear map based on the plurality of prismatic maps;
producing, using the 3D piecewise-linear map, a deformed neural radiance field representing the object in a designated position; and
storing, using the deformed neural radiance field, an injective representation of the object.

16. The non-transitory computer-readable medium of claim 15, wherein the instructions cause the processing device to define at least one two-dimensional (2D) mesh deformation based on a designated position of an object represented by the input neural radiance field.

17. The non-transitory computer-readable medium of claim 15, wherein the instructions cause the processing device to render the injective representation on a presentation device.

18. The non-transitory computer-readable medium of claim 17, wherein the instructions cause the processing device to perform operations comprising:
determining a desired plane of deformation; and
rotating a coordinate system to the desired plane of deformation.

19. The non-transitory computer-readable medium of claim 15, wherein the instructions cause the processing device to perform operations comprising:
parameterizing a 2D injective mesh deformation space using a Tutte embedding to provide deformed vertices; and
using the deformed vertices to define a 2D mesh deformation.

20. The non-transitory computer-readable medium of claim 19, wherein the instructions cause the processing device to perform operations comprising:

selectively triangulating each unit square of a disk-topology mesh using same-size isosceles triangles to produce at least one 2D triangular mesh; and using the at least one 2D triangular mesh to define the 2D mesh deformation.

* * * * *